United States Patent
Yamamoto et al.

(10) Patent No.: US 7,914,944 B2
(45) Date of Patent: Mar. 29, 2011

(54) ATMOSPHERE OPEN TYPE FUEL CELL

(75) Inventors: Jun Yamamoto, Tokyo (JP); Satoshi Mogi, Yamato (JP); Kazuyuki Ueda, Tokyo (JP); Toru Nakakubo, Kawasaki (JP); Akiyoshi Yokoi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 140 days.

(21) Appl. No.: 11/947,304

(22) Filed: Nov. 29, 2007

(65) Prior Publication Data

US 2008/0138682 A1 Jun. 12, 2008

(30) Foreign Application Priority Data

Dec. 7, 2006 (JP) ................................. 2006-330271

(51) Int. Cl.
*H01M 2/08* (2006.01)
*H01M 8/10* (2006.01)
(52) U.S. Cl. .................... 429/509; 429/481; 429/514
(58) Field of Classification Search .............. 429/12–46, 429/400–535
See application file for complete search history.

(56) References Cited

U.S. PATENT DOCUMENTS

| | | | |
|---|---|---|---|
| 6,986,961 B1 * | 1/2006 | Ren et al. ................... | 429/38 |
| 2003/0059660 A1 * | 3/2003 | Kamo et al. ................ | 429/32 |
| 2007/0190383 A1 | 8/2007 | Mogi et al. | |
| 2007/0231665 A1 | 10/2007 | Ueda | |

FOREIGN PATENT DOCUMENTS

JP 2004-146265 A 5/2004

OTHER PUBLICATIONS

JP 2004-146265A Machine Translation originally published to Komoda et al. May 20, 2004.*
Human Translation of JP 2004-146265 originally published May 2004 to Ui et al.*

* cited by examiner

*Primary Examiner* — Basia Ridley
*Assistant Examiner* — Jonathan G Leong
(74) *Attorney, Agent, or Firm* — Fitzpatrick, Cella, Harper & Scinto

(57) ABSTRACT

There is provided a fuel cell including a fuel cell unit having a membrane electrode assembly having catalyst layers provided on both surfaces of a polymer electrolyte membrane, the membrane electrode assembly being sandwiched between an oxidizer electrode and a fuel electrode; the fuel cell unit further including a gas diffusion layer laminated on the catalyst layer on a oxidizer electrode side; a flow path forming member provided on the gas diffusion layer; and a support member surrounding a portion where the gas diffusion layer comes into contact with the membrane electrode assembly; the support member being disposed in a position between the flow path forming member and the polymer electrolyte membrane, the position being opposed, with respect to the polymer electrolyte membrane, to a sealing material disposed on a side of the fuel electrode, for sealing the fuel electrode.

11 Claims, 14 Drawing Sheets

ATMOSPHERE OPEN TYPE FUEL CELL

BACKGROUND OF THE INVENTION

1. Field of the Invention

The present invention relates to a power generation portion of a fuel cell.

2. Description of the Related Art

A polymer electrolyte fuel cell basically includes a polymer electrolyte membrane having proton conductivity, and a pair of catalyst layers and electrodes provided on both surfaces of the polymer electrolyte membrane.

In general, each of the catalyst layers includes a catalyst made of platinum or a metal belonging to the platinum group. A gas diffusion layer is provided on an outer surface of the catalyst layer, for supplying gas and collecting current.

An assembly in which the polymer electrolyte membrane and the catalyst layers are integrated into one is referred to as a membrane electrode assembly (MEA) having a structure in which a fuel (hydrogen) is supplied to one of electrodes and an oxidizer (oxygen) is supplied to another electrode to conduct power generation. An electric power is taken out from the electrodes on both sides.

A theoretical voltage of a pair of membrane electrode assemblies is about 1.23 V, and in a normal operation condition, the pair of membrane electrode assemblies are driven by about 0.7 V in many cases.

Accordingly, in a case where a higher activation voltage is required, plural fuel cell units are laminated and arranged electrically in series to be used. A laminate structure of this type is called a fuel cell stack.

In the stack, normally, an oxidizer flow path and a fuel flow path are isolated from each other by a member called a separator.

Each separator of a plate type is formed with concave portions and convex portions. The concave portions facing the membrane electrode assembly constitute gas paths and the convex portions constitute current collecting portions.

For the fuel cell used for portable electronic devices, it is required that auxiliary devices etc. such as a fan and a blower be omitted in order to achieve downsizing and higher output.

Oxygen serving as the oxidizer is desirably supplied by natural diffusion of air. Further, in a laminate-type stack structure, the air is taken in only through a side surface of the stack.

Accordingly, in order to sufficiently supply the air, it is necessary to increase a thickness of the separator, thereby increasing an air take-in area.

On the other hand, in order to achieve downsizing and higher output of the stack, it is necessary that the thickness of the separator be reduced as much as possible to attain high density mounting.

With the above-mentioned structure, a surface of the separator on a side of the membrane electrode assembly has a concave-convex shape, and the air take-in area to each of fuel cell units is a sum of sectional areas of the concave portions. The separator also has a function of collecting current generated in the fuel cell unit through a contact portion and of allowing the current to flow to the adjacent fuel cell unit or to a take-out electrode to the outside. It is necessary that an area occupied by the convex portions be large to a certain degree. A balance between the areas of the concave portions and the convex portions is appropriately set depending on a value of a current to be taken out. The areas of the concave portions and the convex portions have a trade-off relationship with each other. That is, it is difficult to ensure both sufficient taking-in of the air and a sufficient contact area.

Regarding this, Japanese Patent Application Laid-Open No. 2004-146265 proposes a fuel cell having a structure in which an air take-in area can be made larger than that of the separator having the concave-convex shape and nonuniformity in current collection is relieved. For those fuel cells, there is employed a fuel cell stack having a structure in which plural disk-shaped fuel cell units are laminated and atmospheric air is used.

Further, as an air take-in mechanism on the oxidizer electrode side, there is not used the separator having grooves as the gas flow paths formed therein, and there is disposed a conductive porous member.

Specifically, from the membrane electrode assembly side, a carbon paper serving as a gas diffusion layer and a foamed metal serving as a flow path forming member are laminated in the stated order.

By the conductive porous member, two functions of the gas flow path and the current collection are achieved. Therefore, compared to the separator of the concave-convex shape, the air take-in area can be made larger, and the nonuniformity in current collection is relieved.

Further, in those fuel cells, hydrogen is supplied to the fuel electrode of each of the fuel cell units through a through hole formed in a center of the disk shape, and on an end surface of an outer periphery of the fuel electrode side thereof, there is provided a sealing material so as to prevent leakage of the hydrogen.

Further, air is supplied through an outer peripheral portion of the oxidizer electrode side of the fuel cell unit though natural diffusion, and on an end surface of an inner periphery of the oxidizer electrode side thereof, there is provided a sealing material so as to prevent the air from mixing with the hydrogen.

Further, the stack is structured by fastening a central portion of the disk by a bolt.

However, the related art example disclosed in Japanese Patent Application Laid-Open No. 2004-146265 includes a portion where sealing of the fuel is imperfect.

In the fuel cell stack, the sealing of the fuel is performed by compressing the sealing material which is an elastic body by a fastening force.

However, a mating member opposed to the sealing material with respect to the polymer electrolyte membrane is an elastic body such as a carbon cloth or a carbon paper.

Accordingly, there arises a problem in that due to compression deformation of the mating elastic body, it is difficult to apply the fastening pressure to the sealing material.

Further, with the carbon cloth or the carbon paper, due to surface roughness of the material, it is difficult to uniformly apply the fastening pressure to the sealing material.

On the other hand, when consideration is made only of the sealing and the fastening pressure is increased, there is increased a risk of occurrence of problems such as breakage of the polymer electrolyte membrane and increase in gas flow path resistance due to excessive deformation of the flow path forming member.

Accordingly, it is difficult to perfectly perform the sealing and there is a concern about leakage of the fuel.

SUMMARY OF THE INVENTION

It is an object of the present invention to provide a fuel cell which uses air as an oxidizer, in which an air take-in area and current collection performance are ensured, a fastening pressure can be uniformly applied to a sealing material, and sealing of a fuel can be performed more reliably.

The present invention provides a fuel cell including a fuel cell unit having a membrane electrode assembly having catalyst layers provided on both surfaces of a polymer electrolyte membrane, the membrane electrode assembly being sandwiched between an oxidizer electrode and a fuel electrode, the fuel cell using air in an atmosphere as an oxidizer, and in the fuel cell: the fuel cell unit further includes: a gas diffusion layer provided so as to be laminated at least to the catalyst layer on a side of the oxidizer electrode of the membrane electrode assembly; a flow path forming member provided so as to be laminated to the gas diffusion layer, for allowing air flow therethrough; and a support member surrounding a portion where the gas diffusion layer comes into contact with the membrane electrode assembly, wherein the support member is disposed in a position between the flow path forming member and the polymer electrolyte membrane, the position being opposed, with respect to the polymer electrolyte membrane, to a sealing material disposed on a side of the fuel electrode of the polymer electrolyte membrane, for sealing the fuel electrode.

According to a first aspect of the present invention, in the fuel cell of the present invention, which uses air in an atmosphere as an oxidizer, an air take-in area and current collection performance are ensured, and a fastening pressure can be uniformly applied to the sealing material, so sealing of a fuel can be performed more reliably.

According to a second aspect of the present invention, in the fuel cell of the present invention, a foamed metal having high structural uniformity is used as the flow path forming member, thereby enabling flow path formation and transmission of the fastening pressure of higher uniformity.

According to a third aspect of the present invention, in the fuel cell of the present invention, there is no need for working a surface of the flow path forming member, so mechanical machining with respect to the flow path forming member can be facilitated.

According to a fourth aspect of the present invention, in the fuel cell of the present invention, by the easier mechanical machining with respect to the flow path forming member, alignment of components with each other at a time of manufacturing the fuel cell can be facilitated.

According to a fifth aspect of the present invention, in the fuel cell of the present invention, excessive compression of a peripheral portion of the flow path forming member is prevented, and the alignment of the components with each other at the time of manufacturing the fuel cell can be facilitated.

According to a sixth aspect of the present invention, in the fuel cell of the present invention, a member for applying a fastening pressure to a support member is a gas diffusion layer having higher surface flatness than the flow path forming member, so a thickness of the support member can be made smaller, and factors for inhibiting communication of air from a side surface can be further reduced.

According to a seventh aspect of the present invention, in the fuel cell of the present invention, spaces in the flow path forming member can be made larger, so a risk of flow paths being blocked by water generated by power generation reaction can be reduced.

According to an eighth aspect of the present invention, in the fuel cell of the present invention, the thickness of the support member can be made much smaller so that the factors for inhibiting the air flow from the side surface can be further reduced.

According to a ninth aspect of the present invention, in the fuel cell of the present invention, the fastening pressure can be uniformly applied to the sealing material, so the sealing of the fuel can be performed more reliably.

According to a tenth aspect of the present invention, in the fuel cell of the present invention, the fastening pressure can be more uniformly applied to the sealing material, so the sealing of the fuel can be performed more reliably.

According to an eleventh aspect of the present invention, in a fuel cell stack of the present invention, in which plural fuel cell units are laminated, excessive deformation of a gas diffusion layer and a flow path forming member of each of the fuel cell units can be prevented.

Further features of the present invention will become apparent from the following description of exemplary embodiments with reference to the attached drawings.

DESCRIPTION OF THE EMBODIMENTS

Next, a description will be made of a fuel cell according to an embodiment of the present invention.

Figure 1:
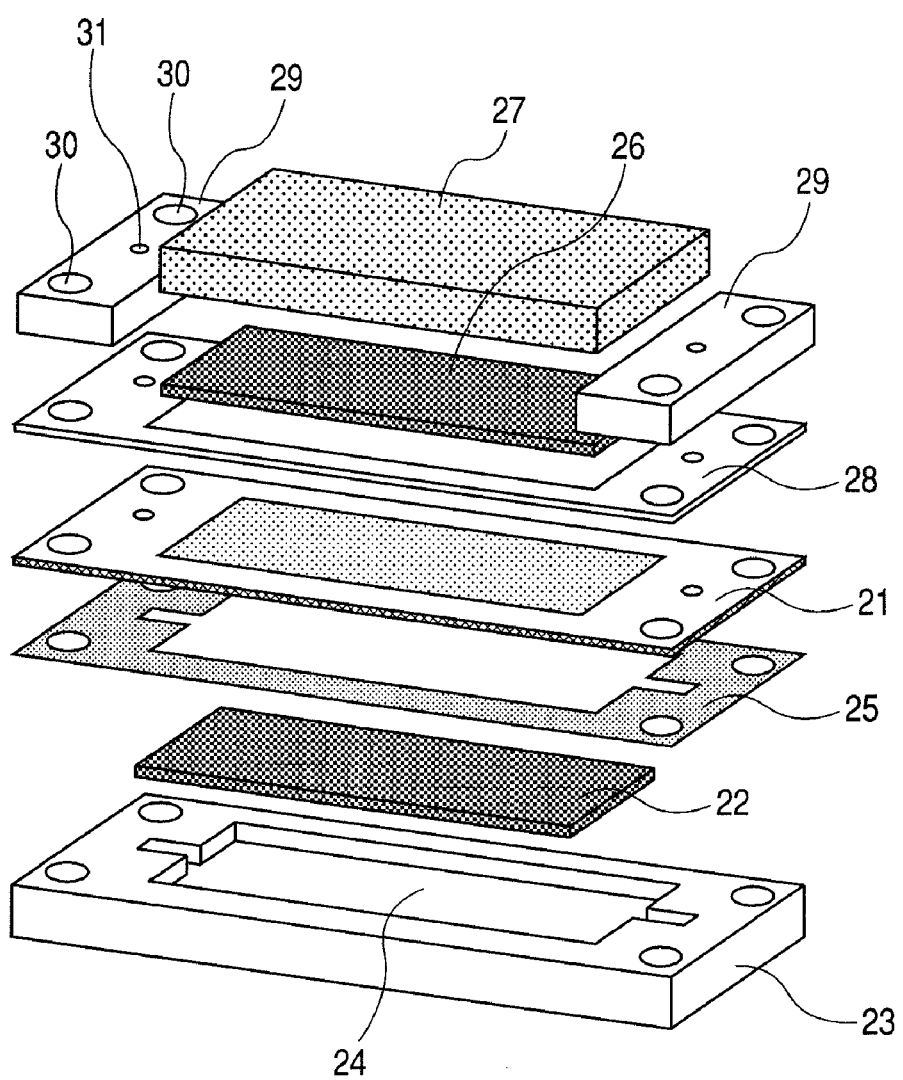
FIG. 1 is an exploded perspective view for illustrating a structure of a fuel cell unit of a fuel cell according to an embodiment of the present invention.

FIG. 1 is a schematic exploded perspective view for illustrating a structure of a fuel cell unit of a fuel cell according to this embodiment.

Figure 2:
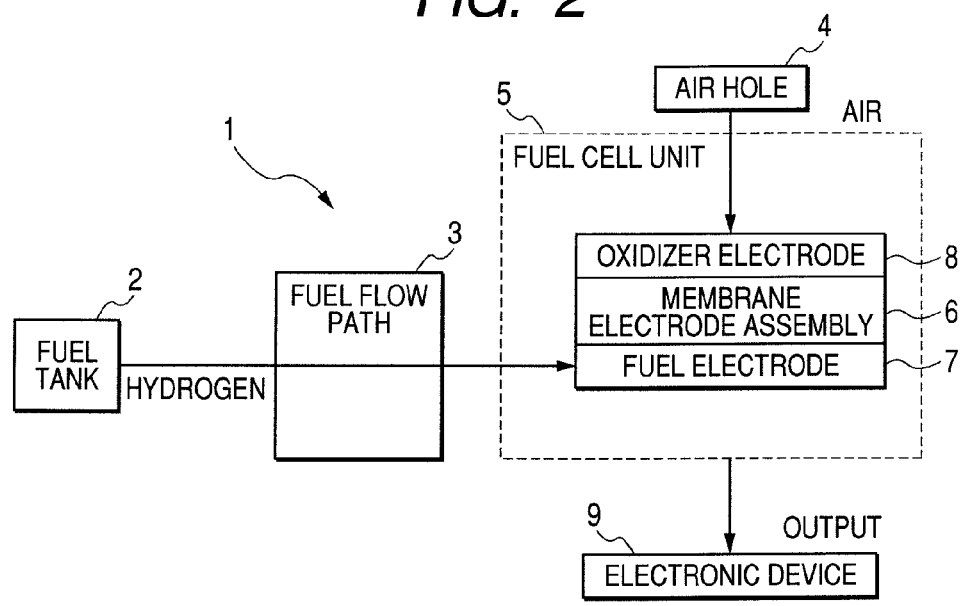
FIG. 2 is a diagram for illustrating a schematic structure of a fuel cell system according to an embodiment of the present invention.
Figure 3:
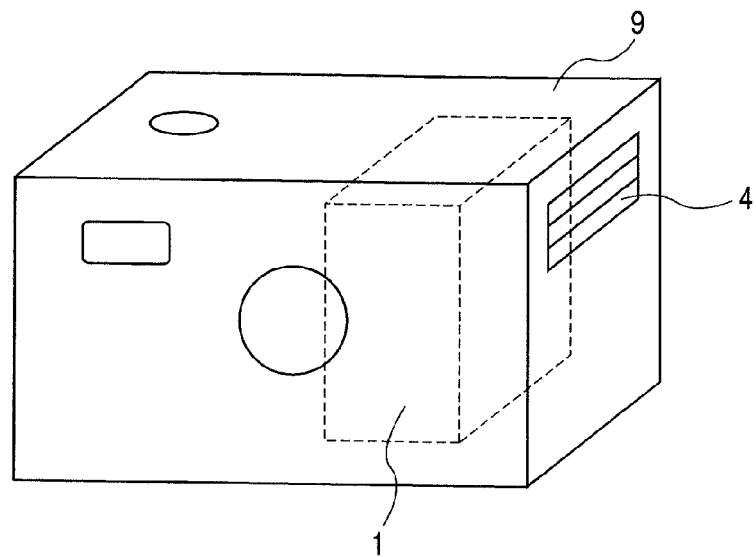
FIG. 3 is a schematic diagram of a structure of an electronic device to which the fuel cell system according to the embodiment of the present invention is mounted.
Figure 4:
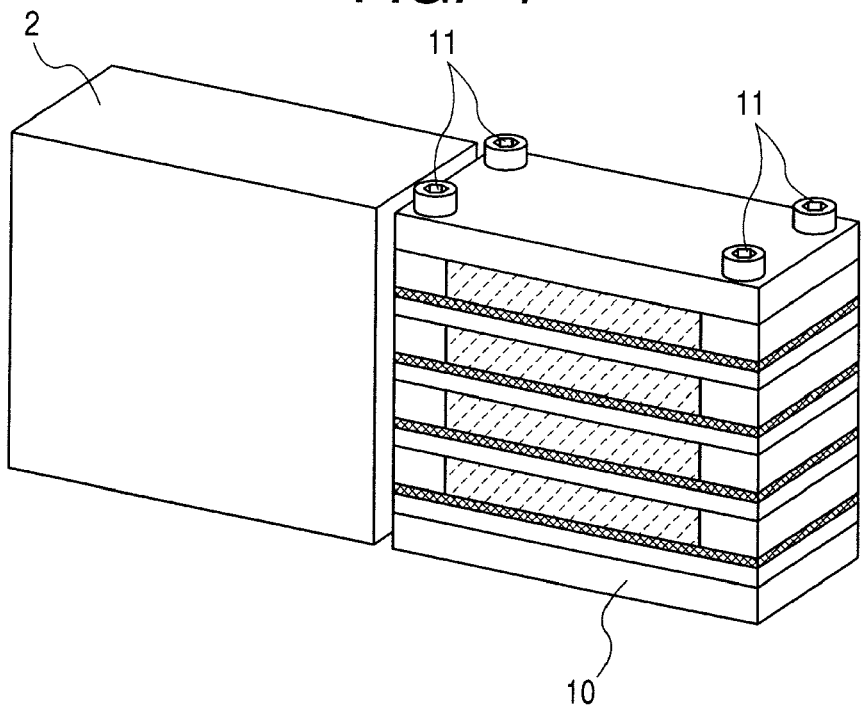
FIG. 4 is a perspective view for illustrating a structure of the fuel cell stack of the fuel cell according to the embodiment of the present invention.

Further, FIG. 2 is a diagram for illustrating a schematic structure of a fuel cell system according to this embodiment. FIG. 3 is a schematic view illustrating a structure of an electronic device to which the fuel cell system according to this embodiment is mounted. A fuel cell system 1 according to this embodiment includes a fuel cell stack including laminate plural fuel cell units 5 formed of components illustrated in FIG. 1. Those are incorporated in a casing of an electronic device 9.

The casing of the electronic device 9 is provided with an air hole 4 for supplying an oxidizer (air) to the fuel cell system 1 of this embodiment, described later.

A schematic structure of the fuel cell system according to this embodiment is illustrated in FIG. 2.

In FIG. 2, there are provided the fuel cell system 1, a fuel tank 2, a fuel flow path 3, the air hole 4, the fuel cell unit 5, a membrane electrode assembly 6, a fuel electrode 7, an oxidizer electrode 8, and the electronic device 9.

The fuel cell system 1 of this embodiment includes a power generation portion including the fuel electrode and the oxidizer electrode, and the fuel tank for supplying a fuel to the power generation portion.

The fuel cell system 1 of this embodiment may use as a fuel any kinds of fuels such as pure hydrogen and methanol, and may use any system for supplying the fuel.

Further, the power generation portion of the fuel cell basically includes the membrane electrode assembly 6 formed of a polymer electrolyte membrane having proton conductivity and provided with catalyst layers on both surfaces of the polymer electrolyte membrane, and two electrodes including the fuel electrode 7 and the oxidizer electrode 8, which are provided on the catalyst layers on both sides and are formed of a gas diffusion layer and a flow path forming member, respectively.

A hydrogen fuel is supplied to the fuel electrode from the fuel tank 2 through the fuel flow path 3, whereas oxygen is supplied to the oxidizer electrode through the air hole 4 by natural diffusion of air.

For the polymer electrolyte membrane, any material having proton conductivity and gas barrier property may be used. In particular, a perfluorosulfonic acid-based proton exchange resin membrane is desirable. The polymer electrolyte membrane needs to be quickly humidified by back diffusion of water generated by reaction in the oxidizer electrode, so it is desirable that the polymer electrolyte membrane be as thin as possible. When consideration is made of mechanical strength, gas barrier property, or the like, a thickness of about 50 µm is desirable.

The membrane electrode assembly is fabricated as follows, for example.

First, catalyst carrying particles such as platinum black and platinum carrying carbon, a polymer electrolyte solution, and an organic solvent such as isopropyl alcohol are mixed together to produce a catalyst ink.

Then, the catalyst ink is applied to and form a film on a polymer film such as polytetrafluoroethylene (PTFE) and on a carbon electrode substrate of an conductive porous body by a spray coating method, a screen printing method, a doctor blade method, or the like to thereby form a catalyst layer.

Next, the catalyst layer thus obtained is contact-bonded by thermal transfer, etc. on both sides of the polymer electrolyte membrane with the catalyst carrying side being inside, thereby enabling obtaining the membrane electrode assembly.

The fuel tank 2 may be of any type as long as being capable of supplying the hydrogen fuel to the fuel cell.

As the fuel therefor, there is given pure hydrogen, hydrogen stored in a hydrogen storage material, or a liquid fuel such as methanol and ethanol.

Further, there may be employed a system which includes the liquid fuel and a reformer thereof, and supplies a reformed hydrogen to the fuel cell.

In order to obtain the fuel cell having high output density, it is desirable to employ a system which supplies pure hydrogen as the fuel.

In addition, when a hydrogen storage alloy is used, the hydrogen can be efficiently stored at a lower pressure, which is more desirable.

In order to prevent the hydrogen fuel supplied from the fuel tank from leaking to an outside of the fuel cell system, for the fuel flow path 3 and the fuel electrode chamber, a sealing material is disposed on connecting portions between respective parts and an outer peripheral edge of the fuel electrode.

Next, with reference to FIG. 1, a description will be made of a structure of the fuel cell unit of the fuel cell system according to this embodiment.

In FIG. 1, there are provided a membrane electrode assembly 21, gas diffusion layers 22 and 26, an electrode plate 23, a fuel electrode chamber 24, a sealing material 25, a flow path forming member 27, a support member 28, structure retaining members 29, bolt holes 30, and fuel flow paths 31. Note that, in the following figures, the same components are denoted by the same reference numerals as those of FIGS. 1 and 2.

The fuel cell unit according to this embodiment includes, on the fuel electrode side, the electrode plate 23, the gas diffusion layer 22, and the sealing material 25, and, on the oxidizer electrode side, the gas diffusion layer 26, the flow path forming member 27, the support member 28, and the structure retaining members 29, with the membrane electrode assembly 21 being sandwiched between the components on the fuel electrode side and the components on the oxidizer electrode side.

The electrode plate 23 on the fuel electrode side is made of metal such as conductive stainless steel, which is gold plated, and is provided with the fuel electrode chamber 24 in a position corresponding to the fuel electrode.

The gas diffusion layer 22 is a conductive member having air permeability, which is made of carbon paper, carbon cloth, or the like, and is accommodated in the fuel electrode chamber.

The sealing material 25 is a material having sealing function, and is disposed so as to surround an outer peripheral edge of the electrode plate. At a time of fastening, the sealing material 25 forms a sealed space between the membrane electrode assembly 21 and the electrode plate 23, thereby preventing leakage of hydrogen from the fuel electrode chamber. As the sealing material, a gasket, an O-ring, or the like may be preferably used. Further, an adhesive for bonding the membrane electrode assembly to the electrode plate can be regarded as the sealing material. Of the adhesives, a hot-melt type adhesive sheet is preferable in terms of productivity.

On the oxidizer electrode side, the gas diffusion layer 26 and the flow path forming member 27 are laminated to each other.

For the gas diffusion layer 26, similarly to the gas diffusion layer 22 on the fuel electrode side, carbon paper, carbon cloth, or the like is used.

As a desirable material of the flow path forming member 27, there may be employed metal such as stainless steel, nickel, or chrome. With regard to a form of the flow path forming member 27, a foamed metal obtained by making the above-mentioned metal porous is excellent in forming highly uniform flow paths and transmitting fastening pressure, so the foamed metal may be used desirably. Further, there may be desirably used a parallel columnar member including columnar members made of the above-mentioned metal or a three-dimensional grid-like member because, in those members, larger flow paths can be formed and a risk of the flow paths being blocked by generated water can be reduced.

The support member 28 is disposed in a position surrounding a periphery of a contact portion between the gas diffusion layer 26 and the membrane electrode assembly 21 and corresponding to the sealing material 25.

For a material of the support member 28, conductivity is not required, but high corrosion resistance and high rigidity are required. Accordingly, metal such as stainless steel, ceramics, or plastics may be desirably used.

Further, a surface on a side of the polymer electrolyte membrane of the support member 28 desirably has high flatness.

When a surface roughness on the polymer electrolyte membrane side of the support member be smaller than a surface roughness of the gas diffusion layer which is used, the fastening pressure can be applied to the sealing material 25 in a highly uniform manner, thereby being desirable.

For example, a representative material used for the gas diffusion layer, that is, carbon paper (manufactured by TORAY INDUSTRIES, INC., TGP-H-030, TGP-H-060, TGP-H-090, or TGP-H-120) has a surface roughness of 8 μm.

Further, it is desirable that the support member 28 be sufficiently thin compared with the flow path forming member 27 and do not inhibit air flow from a surface on a side of the fuel cell.

Further, on an opposite side of the surface of the support member 28, coming into contact with the polymer electrolyte membrane, there is provided the flow path forming member 27. At the time of fastening, at least a part of the support member 28 is directly or indirectly applied with a pressure from the flow path forming member 27.

The structure retaining member 29 is formed of a member having higher rigidity than that of the flow path forming member 27. By regulating a height of the fuel cell unit, specifically, a thickness of the gas diffusion layer 26 and the flow path forming member 27, the structure retaining member 29 prevents excessive deformation of the gas diffusion layer 26 and the flow path forming member 27.

Further, the structure retaining member 29 has bolt holes 30.

Further, the fuel flow path 31 is formed in the structure retaining member 29. After the fuel cell stack is structured, the fuel flow paths 31 constitute fuel manifolds with respect to a laminating direction of the fuel cell unit. In order to prevent leakage of the fuel from the fuel manifold, it is desirable that a sealing material be appropriately inserted between the components depending on a type of the fuel. The fuel manifold formed as described above is formed by the structure retaining member 29 having high rigidity. Accordingly, leakage of the fuel due to deformation or displacement at the time of fastening or after the fastening can be prevented.

As a high-rigidity material desirably used as a material of the structure retaining member 29, there are provided metal such as stainless steel, ceramics, and plastics.

When the structure retaining member is provided on the support member, the fastening pressure is transmitted to the support member through the structure retaining member, which is desirable for improving alignment of the support member.

The structure retaining member 29 and the support member 28 may be structured separately. However, when the structure retaining member 29 and the support member 28 are integrated into one body, time and effort for an alignment operation at a time of manufacturing the fuel cell are further saved, which is desirable.

Next, a description will be made of the fuel cell stack including the laminate plural fuel cell units of the fuel cell according to this embodiment.

Figure 5:
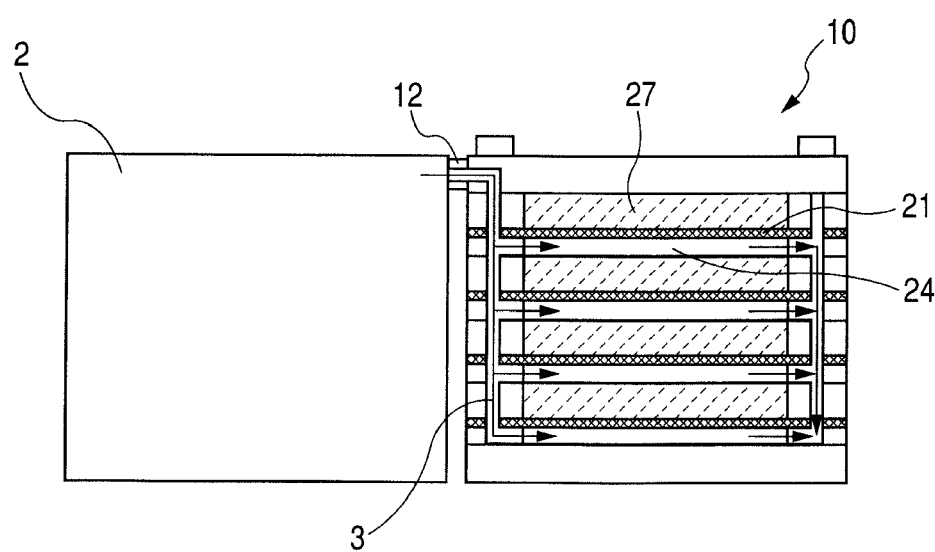
FIG. 5 is a sectional view for illustrating a structure of the fuel cell stack of the fuel cell according to the embodiment of the present invention.
Figure 6:
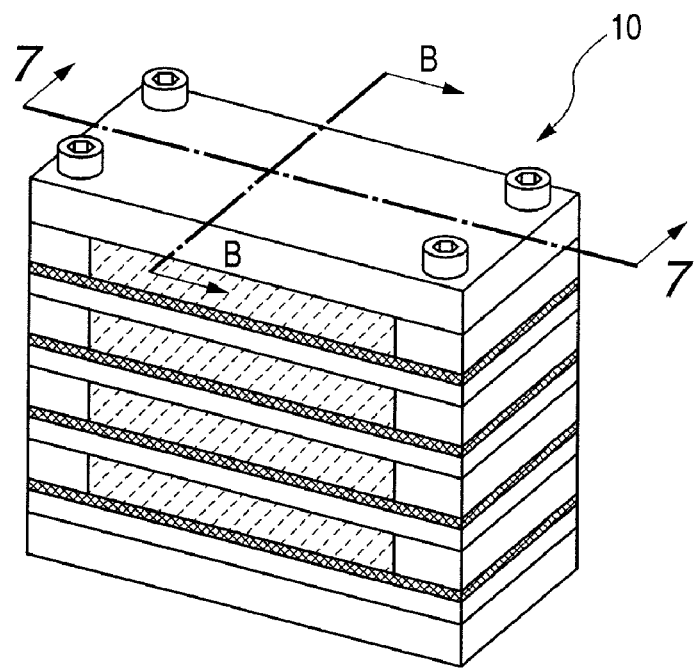
FIG. 6 is a perspective view for illustrating a structure of the fuel cell stack of the fuel cell according to the embodiment of the present invention.
Figure 7:
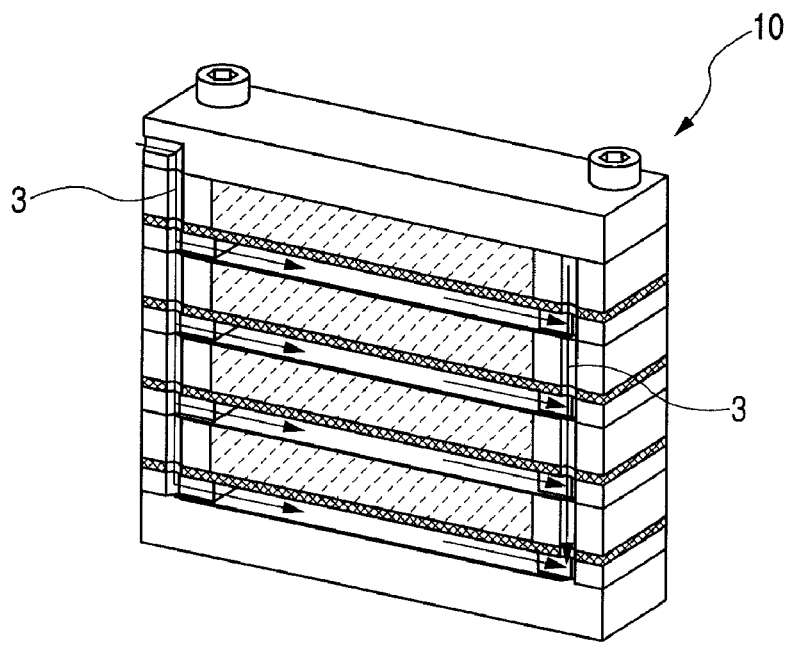
FIG. 7 is a sectional view for illustrating a structure of the fuel cell stack of the fuel cell according to the embodiment of the present invention.

FIGS. 4 to 8 illustrate views for illustrating a structure of the fuel cell stack of the fuel cell according to this embodiment. Note that FIG. 7 is a sectional view taken along the line 7-7 of FIG. 6.

In FIGS. 4 to 8, there are provided the fuel tank 2, the fuel flow path 3, a fuel cell stack 10, stack bolts 11, a coupler 12, and end plates 13.

The fuel cell stack 10 according to this embodiment has a structure in which the plural fuel cell units 5 are connected in series depending on a load of the electronic device. (This embodiment illustrates a structural example in which four fuel cell units 5 are connected to each other.)

Figure 8:
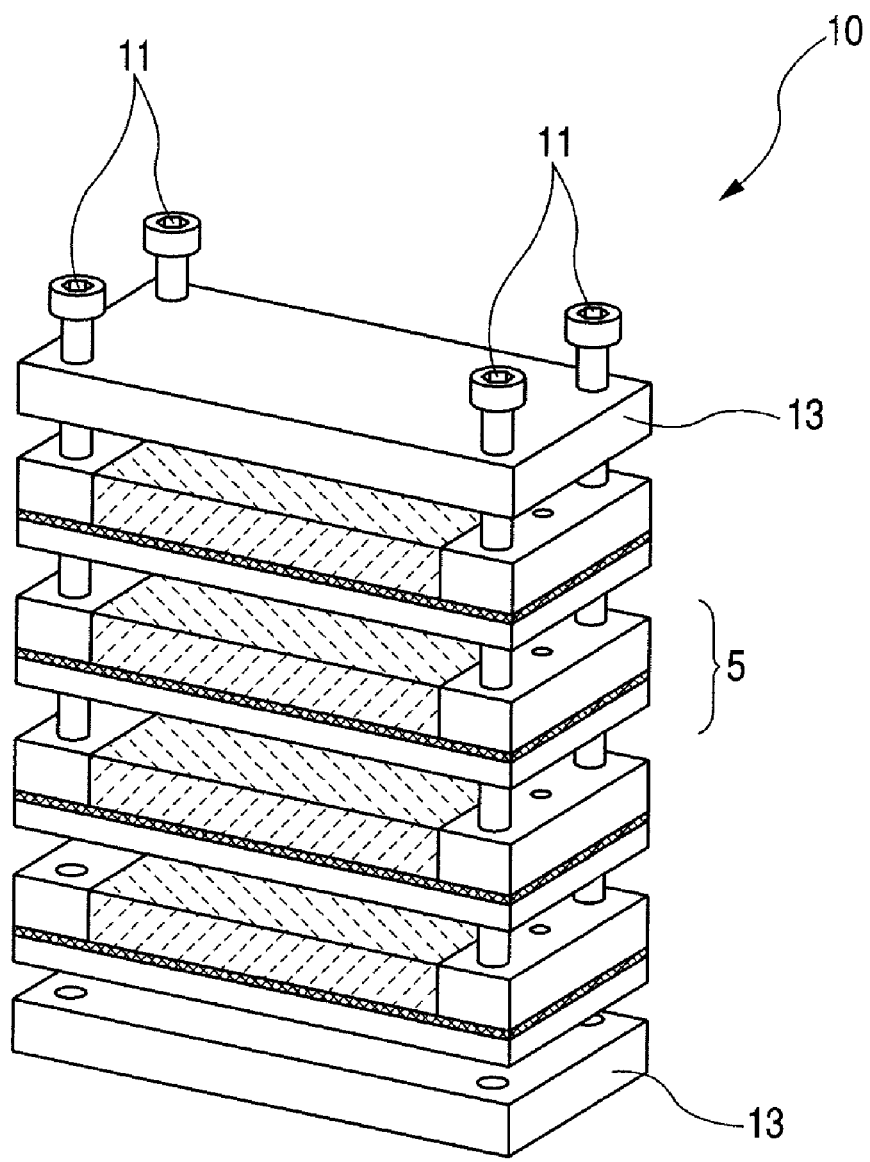
FIG. 8 is a perspective view for illustrating a structure of the fuel cell stack of the fuel cell according to the embodiment of the present invention.

The fuel cell units each have the bolt holes and the fuel flow path and are laminated as illustrated in FIG. 8 to be sandwiched between the end plates 13.

The stack bolts 11 are allowed to pass through the bolt holes so that the fuel cell units are fastened. In this case, in order to prevent the fuel cell units and the end plates 13 from being electrically conductive with each other, it is desirable that bolts having electrical insulation property be used or an insulating member be inserted between each of members having possibility of coming into contact with the bolt, and each of the bolts. As a result, the fuel cell units are electrically connected in series, and the fuel electrodes between the fuel cell units are connected by the fuel flow paths.

Further, in a structure in which the fuel cell units are electrically laminated in series, the same electrode plate is used in common on the fuel electrode side and on the oxidizer electrode side, thereby constituting a bipolar plate.

As illustrated in FIG. 5, the fuel tank is connected to the fuel flow path of the fuel cell stack 10 through the coupler 12.

Hydrogen serving as the fuel is supplied to the fuel cell units through the fuel flow path as illustrated by arrows in FIG. 7.

Further, when air serving as the oxidizer is taken in from the outside, the air is supplied from a portion on a side surface of the fuel cell stack, where the flow path forming members 27 are exposed to the outside.

In this case, the support member 28 is sufficiently thin compared to the flow path forming member 27. Accordingly, even in the fuel cell which allows air flow from the side surface, the air flow is not greatly inhibited.

With the above-mentioned structure of the fuel cell according to this embodiment, in the fuel cell which uses air in atmosphere as the oxidizer, while the air flow and current collection performance are ensured, sealing of the fuel can be performed more reliably. That is, a mating member opposed to the sealing material with respect to the polymer electrolyte membrane has high rigidity and is formed of the support member having high flatness. Accordingly, the fastening pressure can be applied to the sealing material sufficiently and uniformly.

As a result, the sealing property is improved, so the sealing of the fuel can be performed more reliably.

Further, a portion of the gas diffusion layer coming into contact with the membrane electrode assembly is surrounded by the support member receiving the pressure by the flow path forming member at the time of fastening.

Accordingly, by engaging the gas diffusion layer to an inner side of the support member or by engaging a part of the supporting member to a part of the flow path forming member, assembling efficiency of the fuel cell unit can be enhanced by improving the alignment of the members.

In the following, various embodiments of the present invention will be described in detail.

Embodiment 1

Figure 9:
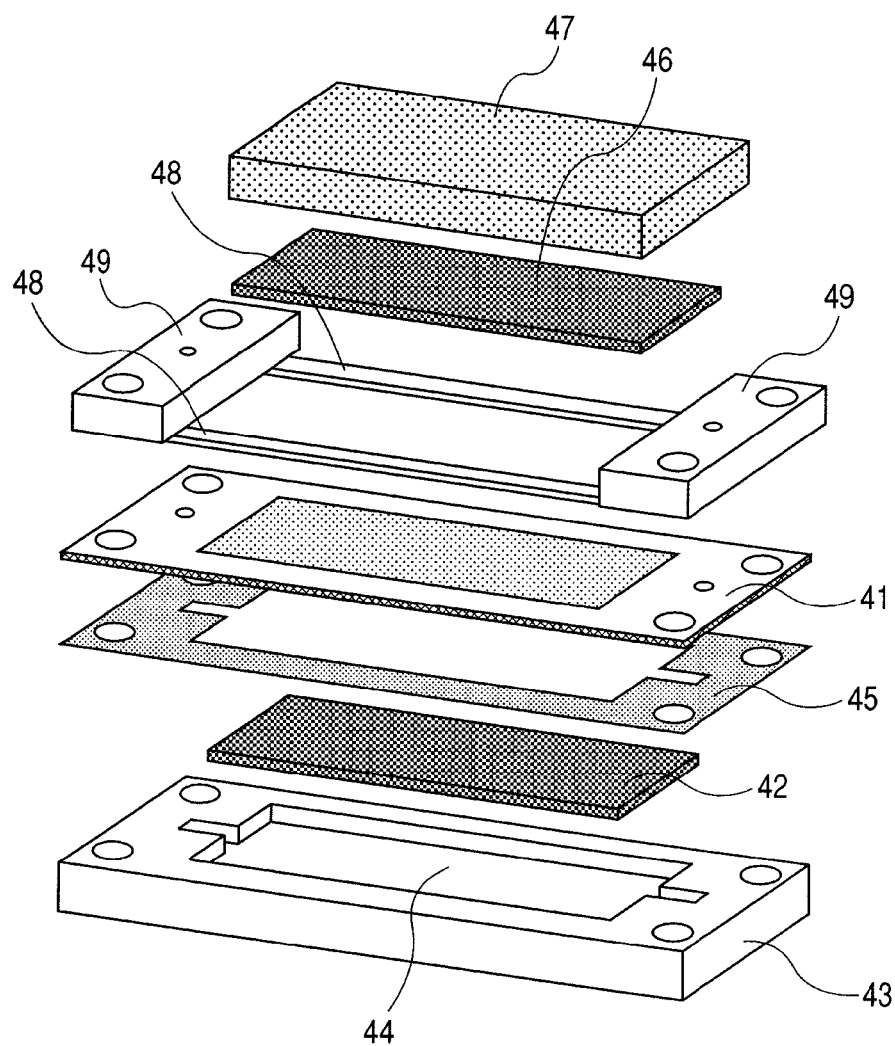
FIG. 9 is an exploded perspective view for illustrating a structure of a fuel cell unit of a fuel cell according to Embodiment 1 of the present invention.

FIG. 9 illustrates a schematic exploded perspective view for illustrating a structure of a fuel cell unit of a fuel cell according to this embodiment. In FIG. 9, there are provided a membrane electrode assembly 41, carbon cloths 42 and 46, an electrode plate 43, a fuel electrode chamber 44, a sealing material 45, a foamed metal 47, a support member 48, and a structure retaining members 49. Note that, in the following figures, the same components are denoted by the same reference numerals as those of FIG. 9.

Figure 10:
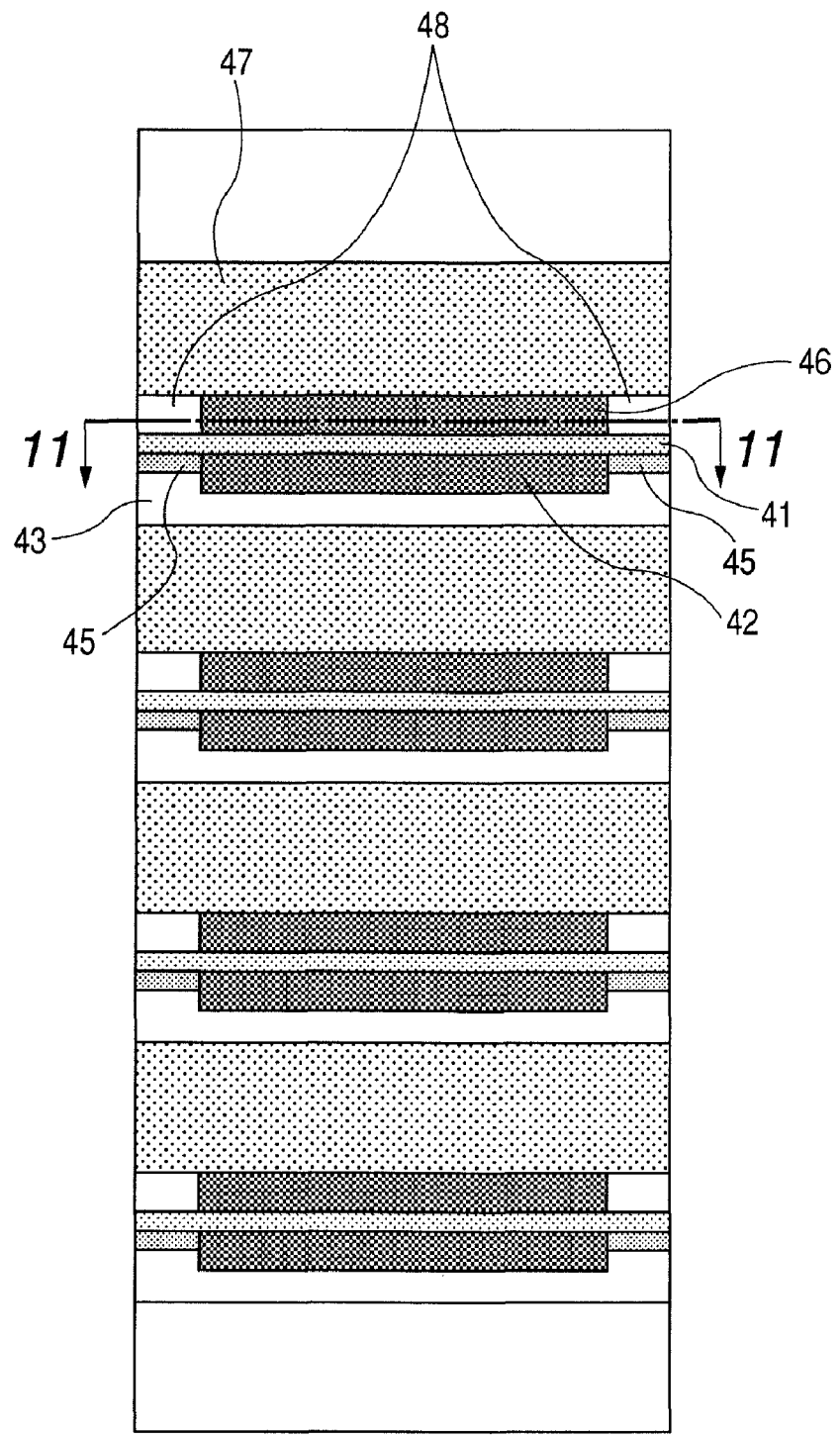
FIG. 10 is a sectional view taken along a position corresponding to the sectional line 7-7 of FIG. 6, for illustrating the structure of the fuel cell unit of the fuel cell according to Embodiment 1 of the present invention.
Figure 11:
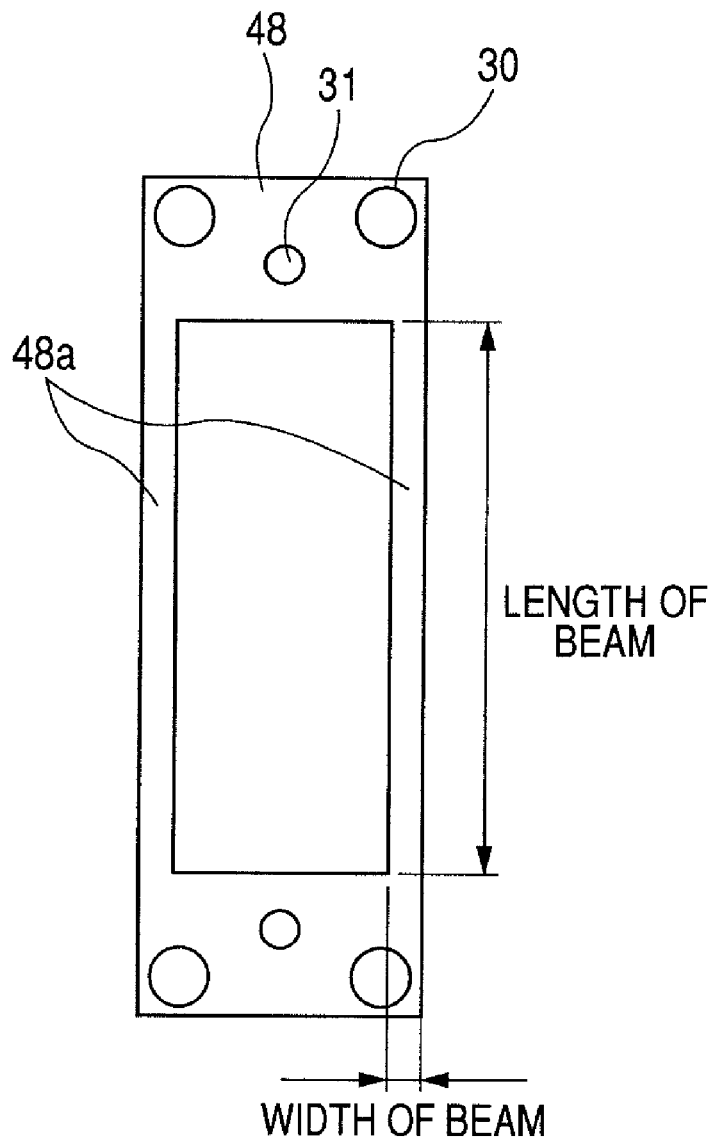
FIG. 11 is a sectional view taken along a position corresponding to the sectional line 11-11 of FIG. 10, for illustrating the structure of the fuel cell unit of the fuel cell according to Embodiment 1 of the present invention.

Further, FIG. 10 is a sectional view taken along a position corresponding to the sectional line 7-7 of FIG. 6. Further, FIG. 11 is a sectional view of the support member 48, taken along a position corresponding to the sectional line 11-11 of FIG. 10. According to this embodiment, in the fuel cell, a cross section of the support member, which is in parallel to the electrode, has a rectangular shape. The structure retaining members are arranged on both two opposed sides of the rectangular shape. The flow path forming member appears to be exposed to the outside from both the other two opposed sides of the rectangular shape.

In this embodiment, a description will be made based on the structure of the fuel cell unit.

First, the inventors of the present invention conducted a study of a structure which could be implemented in a case of using stainless steel as a material of the support member.

A thickness, a width, and a length, of the components used for the study were changed in values depending on corresponding members.

In this embodiment, for a case where a thickness of the support member 48 and width and length of each of beam portions 48a thereof were changed, a sealing state (leak rate) of the fuel was investigated.

The thickness of the support member 48 used for the study was 0.025 mm to 0.75 mm, the width of each of the beam portions 48a was 0.5 mm to 2 mm, and a length thereof is 5 mm to 50 mm.

Further, a surface roughness of the support member 48 was set such that an average surface roughness was equal to or less than about 8 μm.

For the sealing material, a member of a surface type such as a gasket was employed, which had a thickness of 0.15 mm to 0.5 mm, and a width of 0.5 mm to 1.5 mm corresponding to the support member 48. Further, a surface around the fuel electrode chamber, on which the sealing material was disposed, had a width corresponding to the sealing material.

Further, there was also conducted a study of a case where, in place of the gasket 45, an O-ring was disposed by forming a groove in a surface of the electrode plate 43, on which the sealing material was disposed. A desirable wire diameter of the O-ring was about 0.4 mm to 1 mm.

For the gas diffusion layer 46, there was employed carbon paper or carbon cloth manufactured by TORAY INDUSTRIES, INC., E-TEK, Ballard Material Products, or the like, carbon nonwoven cloth manufactured by NOK CORPORATION, or Freudenberg Group, or the like.

For the flow path forming member 47, there was employed a foamed metal obtained by making stainless steel, nickel, chrome, or the like porous. A nominal pore diameter of the foamed metal was equal to or less than about 900 μm, and a study was conducted thereof while changing porosity thereof within a range of 80 to 90%. As a material of the structure retaining member 49, stainless steel was employed.

A sum of a thickness of the gas diffusion layer and a thickness of the foamed metal is regulated by a height of the structure retaining member 49 at the time of fastening. Further, the thickness of the gas diffusion layer and the thickness of the foamed metal may change depending on the thickness of the support member 48.

Accordingly, the thickness of the gas diffusion layer and the thickness of the foamed metal were appropriately adjusted correspondingly to the heights of the structure retaining member 49 and the support member 48.

Specifically, the height of the structure retaining member 49 was adjusted to be 1 mm to 4 mm, the thickness of the support member 48 was adjusted to be 0.025 mm to 0.75 mm as described above.

For the polymer electrolyte membrane constituting the membrane electrode assembly 41, there was used a Nafion membrane (Nafion 111, 112, 115, or 117) manufactured by DuPont, and a thickness thereof was about 0.025 mm to 0.175 mm.

In a case where the fuel cell unit having the above-mentioned structure was fastened, when the fastening pressure was in a range equal to or lower than a fastening pressure at which the polymer electrolyte membrane exhibited an effect of breakage or the like, desirable sealing property could be recognized.

In this case, examples of the effect on the polymer electrolyte membrane include increase in cross leakage amount involved in the breakage of the polymer electrolyte membrane due to application of an excessive fastening pressure and an occurrence of minute short circuit involved in the breakage of the polymer electrolyte membrane. Those can be detected by decrease in an open circuit voltage of the fuel cell unit.

Further, when, for the material of the support member 48, aluminum and magnesium were used in place of the stainless steel to perform the study, by adjusting the thickness, width, length of the support member 48, the desirable sealing property could be obtained.

Further, numerical values of the members are not necessarily limited to the above-mentioned ranges, and by performing the adjustment between the members, the numerical values can be appropriately selected.

Example 1

Example 1 is made for explaining a case where, for manufacturing the fuel cell according to Embodiment 1 of the present invention, representative materials and numerical values are employed.

A width of the fuel cell was about 10 mm and a length thereof was about 30 mm.

For the electrode plate 43 on the fuel electrode side, there was employed a plate made of stainless steel having a thickness of about 0.5 mm, which was gold plated.

In the electrode plate 43, the fuel electrode chamber 44 was formed by digging a portion corresponding to the fuel electrode to have a depth of about 0.2 mm.

In the fuel electrode chamber 44, carbon cloth was disposed as the gas diffusion layer 42. As the carbon cloth, LT2500W manufactured by E-TEK was employed, and the carbon cloth had a thickness of about 0.4 mm before the fastening, and was compressed to have a thickness of about 0.3 mm at the time of fastening.

Accordingly, with the carbon cloth being accommodated in the fuel electrode chamber 44 at the time of fastening, contact resistance between the membrane electrode assembly 41 and the electrode plate 43 could be reduced and current collection performance could be maintained.

On the outer periphery of the electrode plate 43 on the fuel electrode side, the sealing material 45 was disposed to form the sealed space between the membrane electrode assembly 41 and the electrode plate 43 at the time of fastening, thereby preventing leakage of hydrogen from the fuel electrode chamber 44.

For the sealing material 45, there was employed a sealing material made of Viton (registered trademark of DuPont) having a thickness of 0.1 mm and a width of 1 mm.

On the oxidizer electrode side, as the gas diffusion layer 46, carbon cloth (LT2500 manufactured by E-TEK) having a thickness of about 0.4 mm was disposed, and as the flow path forming member 47, a foamed metal was disposed. For the foamed metal, there was employed a material containing, as a main component thereof, nickel-chrome having high rigidity, and having a nominal pore diameter of about 900 $\mu$m and porosity of about 90%. Further, a thickness of the foamed metal was about 1.7 mm.

The carbon cloth and the foamed metal were laminated to each other because main functions of those are different from each other.

The carbon cloth was an elastic body, and when being compressed at the time of fastening, the carbon cloth adheres to the catalyst layer. In this case, a current collection area was made larger, but when the carbon cloth was compressed, gas diffusivity was reduced to some extent.

Accordingly, in order to take in air from the side surface of the fuel cell, a foamed metal having higher porosity was disposed. The foamed metal is not brought into contact with the membrane electrode assembly 41, and has a function of imparting conductivity between the carbon cloth and the electrode plate. Accordingly, as long as the carbon cloth can be compressed substantially uniformly, the current collection area may be smaller than the carbon cloth to some degree.

Further, the foamed metal had, on the membrane electrode assembly 41 side, a surface coming into contact with the support member 48 and a surface coming into contact with the carbon cloth. In order to facilitate mechanical machining, thicknesses of both surfaces were the same.

That is, a height of the surface coming into contact with the support member was made the same as a height of the surface coming into contact with the carbon cloth.

The structure retaining members 49 and the support member 48 were integrally formed to each other by a stainless steel material. The structure retaining members and the support member were arranged so as to cover a periphery of the carbon cloth and to correspond to the sealing material on the fuel electrode side.

The thickness of the structure retaining member was set to about 2 mm, the thickness of the support member was set to about 0.3 mm. Further, a width of the beam portion of the support member was set to about 1 mm and a length thereof was set to about 20 mm.

Further, the surfaces of the structure retaining members and the support member on the side coming into contact with the polymer electrolyte membrane constituting the membrane electrode assembly had a flatness higher than the gas diffusion layer 46 owing to surface polishing. Specifically, the surfaces had an average surface roughness Ra of 2 $\mu$m or less. The structure retaining members regulated a height of the fuel cell unit at the time of fastening, so at the time of fastening, the carbon cloth was compressed for about 0.1 mm, and a total sum of the thicknesses of the carbon cloth and the foamed metal became equal to the height of the structure retaining members.

In this case, the carbon cloth is pushed by the foamed metal to be compressed. However, the foamed metal has the surfaces coming into contact with the support member, so when the height of the carbon cloth coincides with the height of the support member, the compression of the carbon cloth stops.

As a result, by adjusting the heights of the contact surfaces between the components in advance, the contact resistance between the carbon cloth and the foamed metal can be reduced without inhibiting the gas diffusivity due to excessive compression of the carbon cloth.

Further, by making the thickness of the support member smaller than the thickness of the foamed metal, even in the fuel cell having a structure with which air is allowed to flow from the side surface thereof, taking-in of the air is rarely inhibited by the support member. Further, the carbon cloth is engaged to the inner side of the support member, thereby saving time and effort for aligning the components. Accordingly, assembling efficiency of the fuel cell unit can be enhanced.

With the structure of the fuel cell according to this example, the support member on the oxidizer electrode side, which is arranged in a position opposed to the sealing material for sealing the fuel electrode, with respect to the polymer electrolyte membrane, is made of a material having high flatness and high rigidity. Accordingly, the fastening pressure can be applied to the sealing material sufficiently and uniformly.

With this structure, the sealing property is enhanced, thereby enabling more reliable sealing of the fuel.

COMPARATIVE EXAMPLE

As a comparative example of a fuel cell of the present invention, there was manufactured a fuel cell having a related art structure with the support member used for the fuel cell according to Example 1 of the present invention being omitted.

The structure of the fuel cell according to the comparative example was the same as that of Example 1 except that the support member was not provided.

Figure 17:
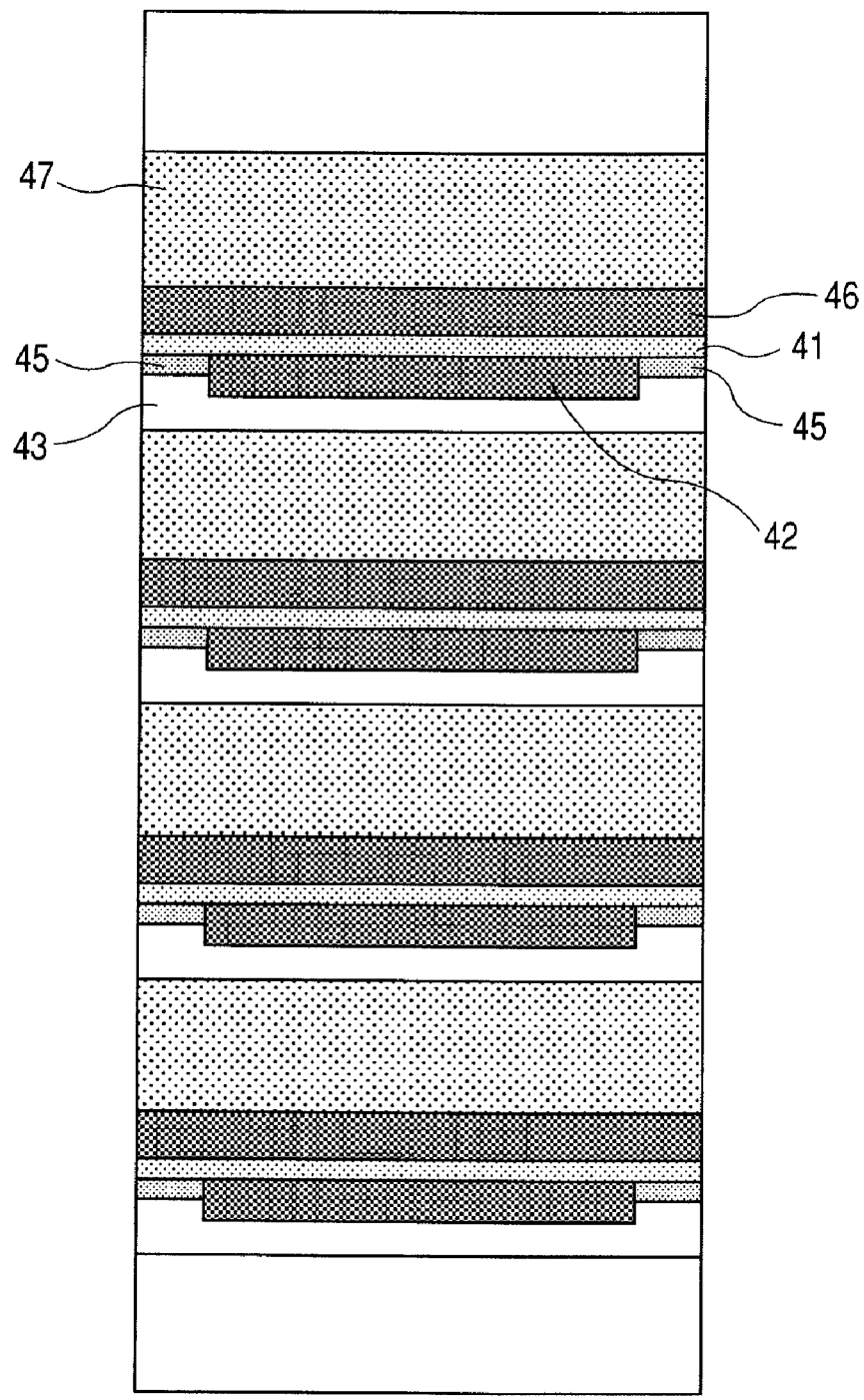
FIG. 17 is a sectional view taken along a position corresponding to the sectional line 7-7 of FIG. 6, for illustrating a structure of a fuel cell unit of a fuel cell according to a comparative example of the present invention.

FIG. 17 is a sectional view taken along a position corresponding to the sectional line 7-7 of FIG. 6, for illustrating a structure of a fuel cell unit of the fuel cell according to the comparative example.

A thickness of the foamed metal was set to about 1.7 mm, a thickness of the carbon cloth on the oxidizer electrode side was set to about 0.4 mm, and the thickness of the structure retaining member was set to about 2 mm. Further, the carbon cloth on the oxidizer electrode side was allowed to extend outwardly by a length of the eliminated support member.

With respect to the manufactured fuel cell according to the comparative example, a leak rate of hydrogen was determined. The leak rate was determined by a flow rate on an upstream side in a case where a hydrogen fuel was supplied to the fuel electrode at about 100 kPaG and a downstream side of the fuel cell was sealed.

As a mass flow meter, SEC-4400R (flow rate range of 200 ccm, for hydrogen) manufactured by HORIBA STEC Co., Ltd. was employed.

In the fuel cell according to the comparative example, variation was caused in leak rate in the manufacture, and there were observed leakage of hydrogen of 1 ccm or more in some cases. Further, in some cases, even when the leakage was not observed within a range of a detection accuracy of the mass flow meter at the time of the manufacture, there suddenly occurred the leakage when the fuel cell was driven. A position where the leakage had occurred was observed on a sealing surface. Accordingly, it is conceivable that the sudden leakage resulted from unstable sealing property due to deformation of the component because the polymer electrolyte membrane contained a moisture content to be swollen, for example.

On the other hand, when the leak rate was measured with regard to the fuel cell manufactured with the support member being disposed as in Example 1, the leakage was not observed within the range of the detection accuracy of the mass flow meter, and the results showed that the leak rate was uniformly equal to or lower than 1 ccm. Further, compared to the comparative example, the swelling and contraction of the polymer electrolyte membrane were caused, thereby allowing the sealing property to be stable.

Embodiment 2

In Embodiment 2 of the present invention, a description will be made of a fuel cell according to another mode to which the present invention is applied.

Figure 12:
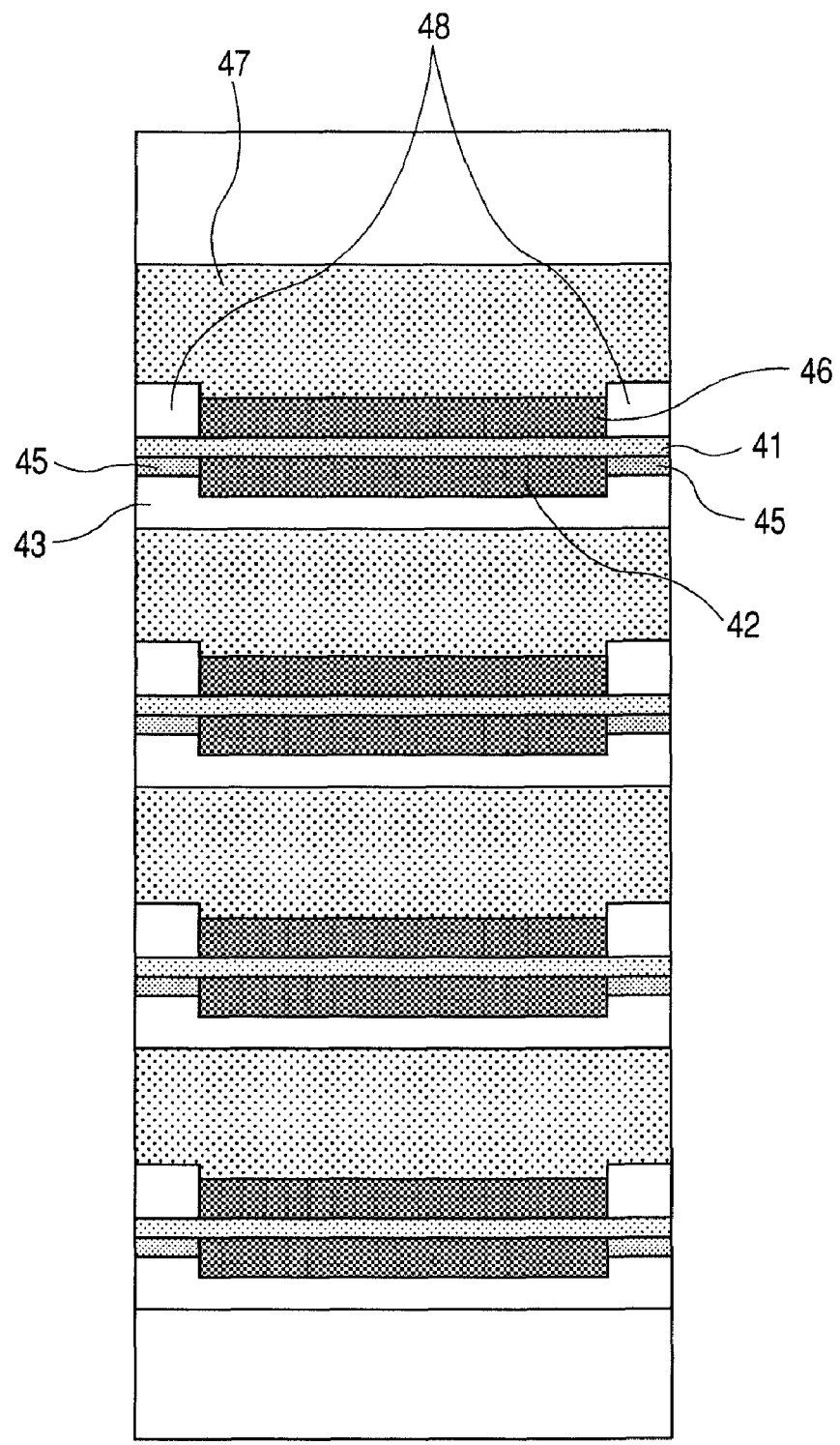
FIG. 12 is a sectional view taken along a position corresponding to the sectional line 7-7 of FIG. 6, for illustrating a structure of a fuel cell unit of a fuel cell according to Embodiment 2 of the present invention.

A structure of the fuel cell of this embodiment is basically the same as that of Embodiment 1 illustrated in FIG. 9 except that a shape of the flow path forming member 47 on the gas diffusion layer 46 side is made convexed in advance. FIG. 12 is a sectional view taken along a position corresponding to the sectional line 7-7 of FIG. 6, for illustrating a structure of a fuel cell unit of the fuel cell of this embodiment.

In this embodiment as well, similarly to the case of Embodiment 1, the description will be made based on the structure of the fuel cell unit.

In this embodiment, as a result of a study of the structure which can be implemented within a range of the same materials and numerical values as those of Embodiment 1, favorable sealing property was obtained.

Example 2

Example 2 was made for illustrating a case where, for manufacturing the fuel cell according to Embodiment 2 of the present invention, representative materials and numerical values were employed.

Note that materials used and a size of the fuel cell were the same as those of Example 1, and in this example, a description is made only of thicknesses of components different from those of Example 1.

A thickness of the carbon cloth serving as the gas diffusion layer 46 on the oxidizer electrode side was set to about 0.4 mm, a thickness of the foamed metal as a whole serving as the flow path forming member 47 was set to about 1.7 mm, a height of the structure retaining member 49 was set to about 2 mm, and a thickness of the support member 48 was set to about 0.5 mm.

The structure retaining members 49 and the support member 48 were integrated with each other by a stainless steel material. The structure retaining members 49 and the support member 48 were arranged so as to surround a periphery of the contact portion between the carbon cloth and the membrane electrode assembly 41 and to correspond to the sealing material 45 on the fuel electrode side.

Further, the surfaces of the structure retaining members 49 and the support member 48, which came into contact with the polymer electrolyte membrane constituting the membrane electrode assembly 41 had higher flatness than the gas diffusion layer 46 owing to surface polishing. Specifically, the surfaces each had an average surface roughness Ra of 2 µm or less.

The foamed metal serving as the flow path forming member 47 had, on the membrane electrode assembly 41 side, surfaces coming into contact with the support member 48 and a surface coming into contact with the carbon cloth serving as the gas diffusion layer 46. In this example, the height of the surface coming into contact with the support member was made smaller than the height of the surface coming into contact with the carbon cloth. That is, a portion of the foamed metal, which came into contact with the carbon cloth serving as the gas diffusion layer 46, had a convex shape protruding to the membrane electrode assembly 41 side, thereby pushing in the carbon cloth to be deeper than the surfaces coming into contact with the support member 48.

The foamed metal can be imparted with the convex shape by shaving the foamed metal in portions coming into contact with the support member 48 by wire machining or the like.

Alternatively, before the assembly of the fuel cell unit is performed, the foamed metal, the support member 48, and the structure retaining members 49 are pressed by being stacked on each other, thereby enabling formation of the foamed metal having the portions coming into contact with the support member 48 being compressed while maintaining a thickness as a whole in advance.

In this example, the height of the contact surface between the foamed metal and the carbon cloth was made about 0.2 mm larger than the height of the contact surfaces between the foamed metal and the support member 48.

As a result, when the carbon cloth was pushed in by the foamed metal about 0.2 mm from the contact surfaces between the foamed metal and the support member 48, that is, when the carbon cloth was compressed by about 0.1 mm, the compression of the carbon cloth was stopped. Accordingly, by adjusting the height between the members in advance, the contact resistance between the carbon cloth and the foamed metal could be made smaller without causing the carbon cloth to be excessively compressed to inhibit the gas diffusivity.

Further, the carbon cloth was engaged to the inner side of the support member 48 and the foamed metal and the support member 48 were engaged to each other. Accordingly, time and effort for aligning the members were little, thereby enabling enhancement of the assembling efficiency of the fuel cell unit. In this example, the above-mentioned structure was provided in order to achieve enhancement of assembling property of the fuel cell unit by engaging, by simple machining such as cutting or compression of end portions of the foamed metal.

In the structure of the fuel cell of this example, the member on the oxidizer electrode side opposed to the sealing material for sealing the fuel electrode, with respect to the polymer electrolyte membrane, had high flatness and high rigidity.

Accordingly, the fastening pressure could be sufficiently and uniformly applied to the sealing material. As a result, the sealing property could be improved and sealing of the fuel can be performed more reliably.

Embodiment 3

In Embodiment 3 of the present invention, a description will be made of a fuel cell according to another mode from the above embodiments, to which the present invention is applied.

A structure of the fuel cell of this embodiment is basically the same as that of Embodiment 1 of the present invention illustrated in FIG. 9 except that the flow path forming member 47 on the gas diffusion layer 46 side is given a concave shape in advance as described later.

Figure 13:
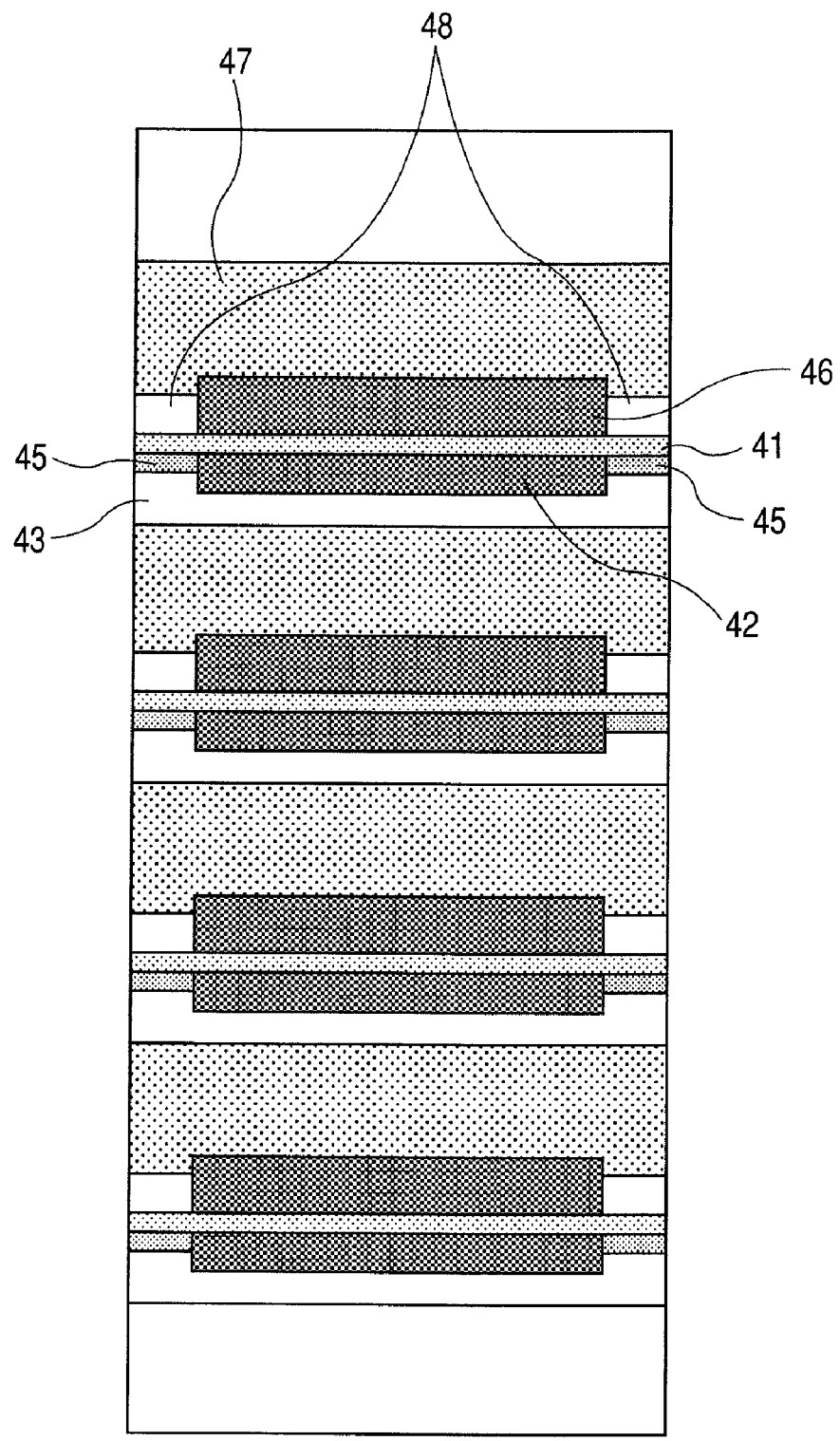
FIG. 13 is a sectional view taken along a position corresponding to the sectional line 7-7 of FIG. 6, for illustrating a structure of a fuel cell unit of a fuel cell according to Embodiment 3 of the present invention.

FIG. 13 is a sectional view taken along the position corresponding to the sectional line 7-7 of FIG. 6, for illustrating a structure of a fuel cell unit of the fuel cell according to this embodiment.

In this embodiment, similarly to the above embodiment, the description is made based on the structure of the fuel cell unit.

In this embodiment, as a result of a study of the structure which could be implemented within a range of the same materials and numerical values as those of Embodiment 1, favorable sealing property was obtained.

Example 3

Example 3 was made for illustrating a case where, for manufacturing the fuel cell according to Embodiment 3 of the present invention, representative materials and numerical values were employed.

Note that materials used and a size of the fuel cell were the same as those of Example 1, and in this example, a description is made only of thicknesses of components different from those of Example 1.

For the carbon cloth serving as the gas diffusion layer 46 on the oxidizer electrode side, a carbon cloth having a thickness of about 0.5 mm was employed.

Further, a thickness of the foamed metal as a whole, serving as the flow path forming member 47 was set to about 1.7 mm, a height of the structure retaining member 49 was set to about 2 mm, and a thickness of the support member 48 was set to about 0.3 mm.

The structure retaining members 49 and the support member 48 were integrated with each other by a stainless steel material. The structure retaining members 49 and the support member 48 were arranged so as to surround a periphery of the contact portion between the carbon cloth and the membrane electrode assembly 41 and to correspond to the sealing material 45 on the fuel electrode side.

Further, the surfaces of the structure retaining members 49 and the support member 48, which came into contact with the polymer electrolyte membrane constituting the membrane electrode assembly 41, had higher flatness than the gas diffusion layer 46 owing to surface polishing. Specifically, the surfaces each had an average surface roughness Ra of 2 µm or less.

The foamed metal serving as the flow path forming member 47 had, on the membrane electrode assembly 41 side, surfaces coming into contact with the support member 48, and a surface coming into contact with the carbon cloth serving as the gas diffusion layer 46. In this example, a height of the surface coming into contact with the support member was made larger than a height of the surface coming into contact with the carbon cloth.

That is, in a portion coming into contact with the carbon cloth serving as the gas diffusion layer 46, the foamed metal had the convex shape depressed so as to be apart from the membrane electrode assembly 41.

In a case where a height of a part of the foamed metal is made smaller than the height thereof as a whole, when the foamed metal is worked by press working, it is necessary to be cautious of making a portion to be worked receive excessive compression to cause the porosity to be extremely small. In particular, when a portion which has received the excessive compression is disposed in a side surface of the fuel cell unit, that is, a portion opening to the atmosphere, taking-in of air is affected in some cases.

Accordingly, in this example, in order to achieve both the enhancement of the assembling efficiency of the fuel cell unit owing to engaging and the taking-in of air, the above-mentioned structure was employed.

In this example, the height of the contact surface between the foamed metal and the carbon cloth was made about 0.1 mm smaller than the height of the contact surfaces between the foamed metal and the support member.

As a result, the carbon cloth was pushed in by the foamed metal. When the carbon cloth was compressed by about 0.1 mm, the compression of the carbon cloth was stopped by the contact surfaces between the foamed metal and the support member.

Accordingly, by adjusting the heights of the contact surfaces between the members in advance, the contact resistance between the carbon cloth and the foamed metal could be reduced without inhibiting the gas diffusivity due to excessive compression of the carbon cloth.

Further, the foamed metal and the carbon cloth engaged to each other, so at the time of assembling the fuel cell unit, assemblability owing to positioning, fixing, or the like could be enhanced.

In the structure of the fuel cell of this example, a member on the oxidizer electrode side opposed to the sealing material for sealing the fuel electrode, with respect to the polymer electrolyte membrane, was a member having high flatness and high rigidity.

Accordingly, the fastening pressure could be sufficiently and uniformly applied to the sealing material. As a result, the sealing property was improved and the sealing of the fuel could be performed more reliably.

Embodiment 4

In Embodiment 4 of the present invention, a description will be made of a fuel cell according to another mode from the above embodiment, to which the present invention is applied.

A structure of the fuel cell of this embodiment is basically the same as that of Embodiment 1 illustrated in FIG. 9 except that the carbon cloth on the oxidizer electrode side outwardly extends so as to exist between the support member and the foamed metal as described later.

Figure 14:
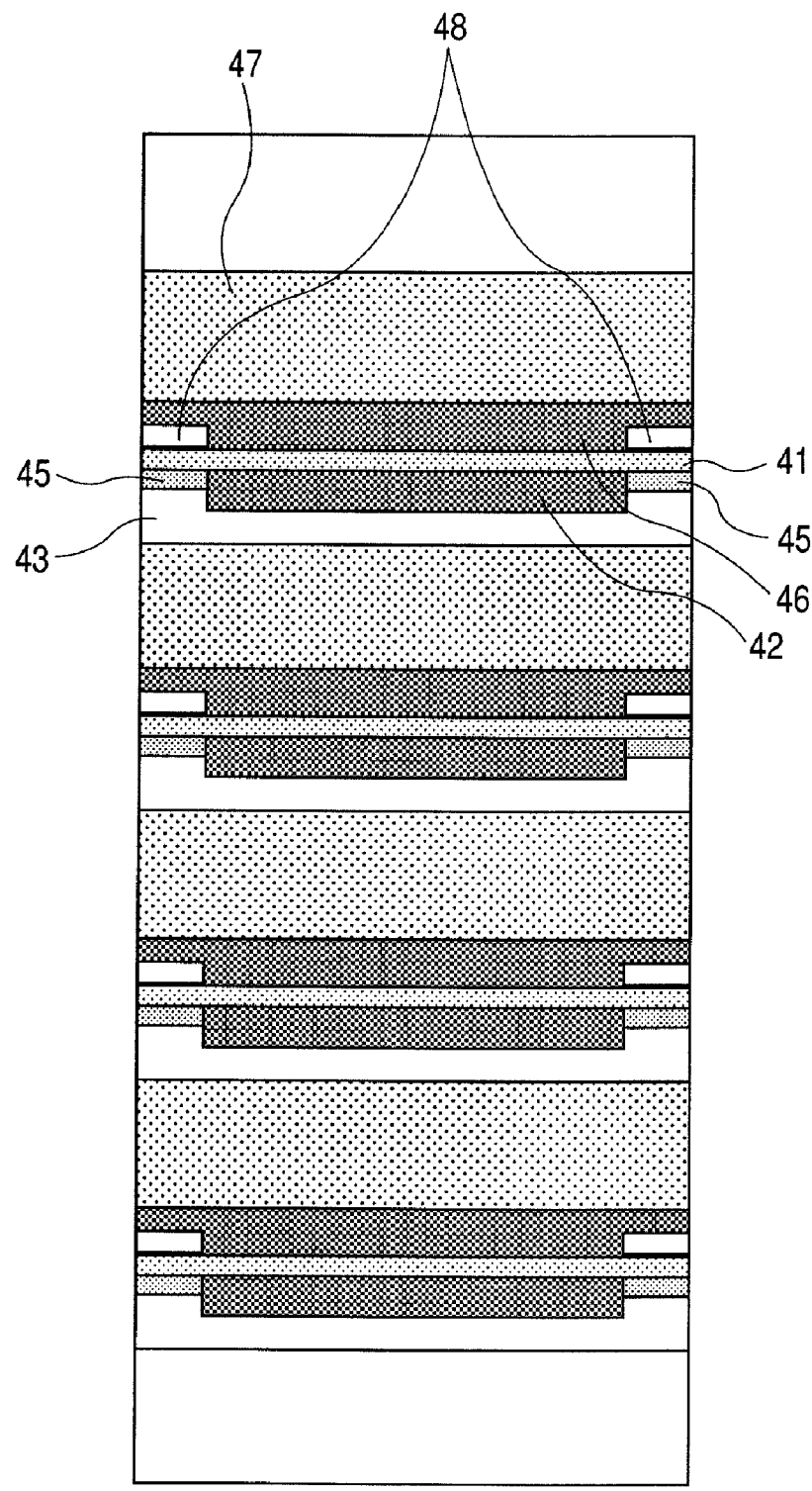
FIG. 14 is a sectional view taken along a position corresponding to the sectional line 7-7 of FIG. 6, for illustrating a structure of a fuel cell unit of a fuel cell according to Embodiment 4 of the present invention.

FIG. 14 is a sectional view taken along a position corresponding to the sectional line 7-7 of FIG. 6, for illustrating a structure of the fuel cell unit of the fuel cell of this embodiment.

In this embodiment, similarly to the above embodiments, a description will be made based on the structure of the fuel cell unit.

In this embodiment, as a result of a study of the structure which could be implemented within a range of the same materials and numerical values as those of Embodiment 1, favorable sealing property was obtained.

Example 4

Example 4 was made for illustrating a case where, for manufacturing the fuel cell according to Embodiment 4 of the present invention, representative materials and numerical values were employed.

Note that materials used and a size of the fuel cell were the same as those of Example 1, and in this example, descriptions are made only of thicknesses of components different from those of Example 1.

For the carbon cloth serving as the gas diffusion layer 46 on the oxidizer electrode side, a carbon cloth having a thickness of about 0.4 mm was employed.

Further, a thickness of the foamed metal as a whole, serving as the flow path forming member 47 was set to about 1.7 mm, a height of the structure retaining member 49 was set to about 2 mm, and a thickness of the support member 48 was set to about 0.05 mm.

The structure retaining members 49 and the support member 48 were made of a stainless steel material and were respectively spaced apart from each other. On the surface of the support member 48, the structure retaining members 49 were arranged. The support member 48 was disposed so as to correspond to the sealing material 45 on the fuel electrode side.

Further, surfaces of the structure retaining members 49 and the support member 48 coming into contact with the polymer electrolyte membrane constituting the membrane electrode assembly 41 had higher flatness than the gas diffusion layer 46 owing to surface polishing. Specifically, the surfaces each had an average surface roughness Ra of 2 μm or less.

The carbon cloth serving as the gas diffusion layer 46 on the oxidizer electrode side outwardly extended compared to that of Example 1, and existed between the support member 48 and the foamed metal. The structure retaining members 49 and the support member 48 were arranged so as to surround the periphery of the contact portion between the carbon cloth and the membrane electrode assembly 41 and to corresponded to the sealing material 45 on the fuel electrode side.

At the time of fastening, the foamed metal compressed the carbon cloth. The height of the foamed metal was defined by the structure retaining members, so the compression stopped when the carbon cloth was pushed in by about 0.1 mm. At this time, portions of the carbon cloth, extending between the support member and the foamed metal, were further compressed by an amount corresponding to the thickness of the support member, thereby imparting the fastening pressure to the support member.

In the structure of the fuel cell of this example, the member on the fuel electrode side opposed to the sealing material 45 for sealing the fuel electrode, with respect to the polymer electrolyte membrane constituting the membrane electrode assembly 41 was a carbon cloth having higher flatness than the foamed metal.

Accordingly, as compared to the case in which the fastening pressure was directly applied to the support member 48 by the foamed metal, the thickness of the support member 48 could be made smaller, so the air take-in area could be made larger.

As a result, the sealing property was improved to perform sealing of the fuel more reliably, and air take-in efficiency could be enhanced.

Embodiment 5

In Embodiment 5 of the present invention, a description will be made of a fuel cell according to another mode to which the present invention is applied.

Figure 15:
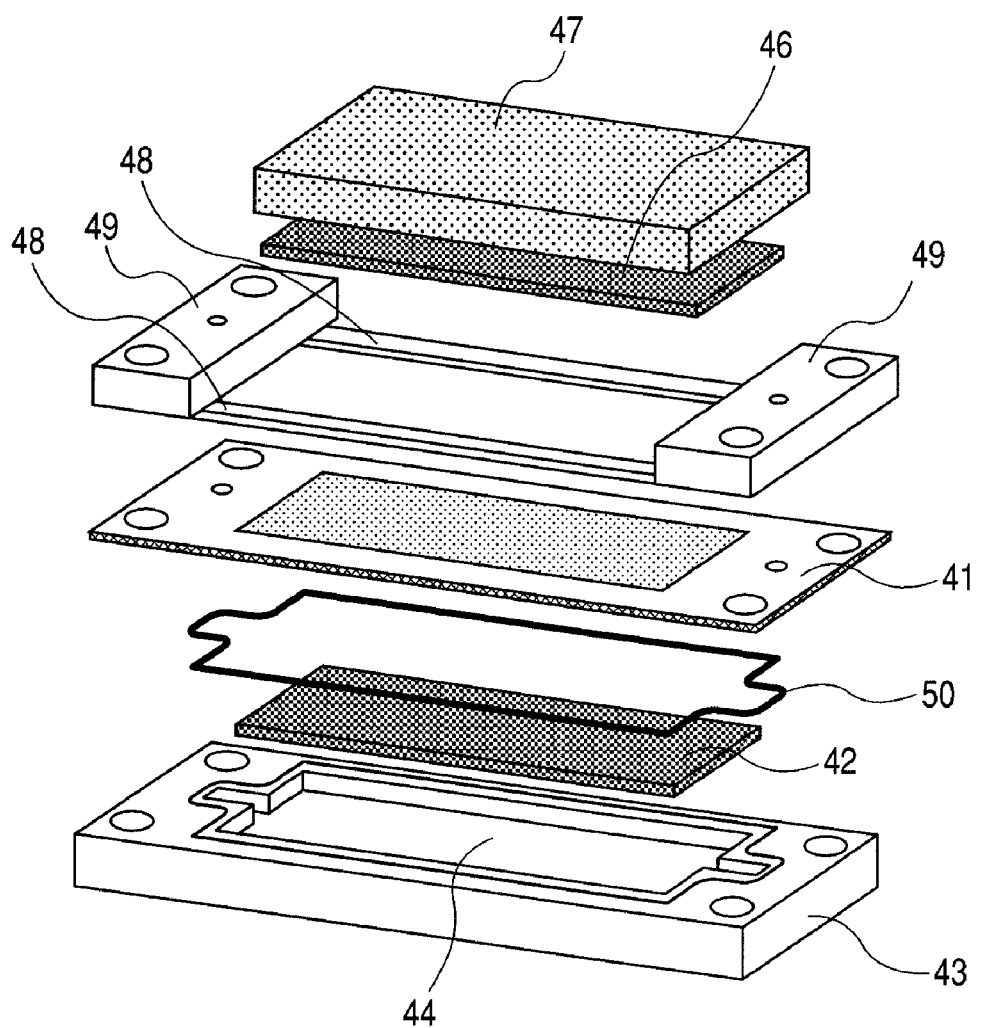
FIG. 15 is an exploded perspective view for illustrating a structure of a fuel cell unit of a fuel cell according to Embodiment 5 of the present invention.

FIG. 15 is a schematic view of a structure of the fuel cell according to this embodiment.

In this embodiment, an O-ring 50 is used in place of the gasket as the sealing material.

The O-ring used here has a wire diameter of about 0.6 mm.

Further, the electrode plate on the fuel electrode side, on which the sealing material is disposed, is formed with a groove in which the O-ring is dropped.

The O-ring enables reduction of the contact area with the sealing material compared to the gasket, so the sealing can be performed with a smaller fastening pressure.

Embodiment 6

In Embodiment 6 of the present invention, a description will be made of a fuel cell according to another mode to which the present invention is applied.

Figure 16:
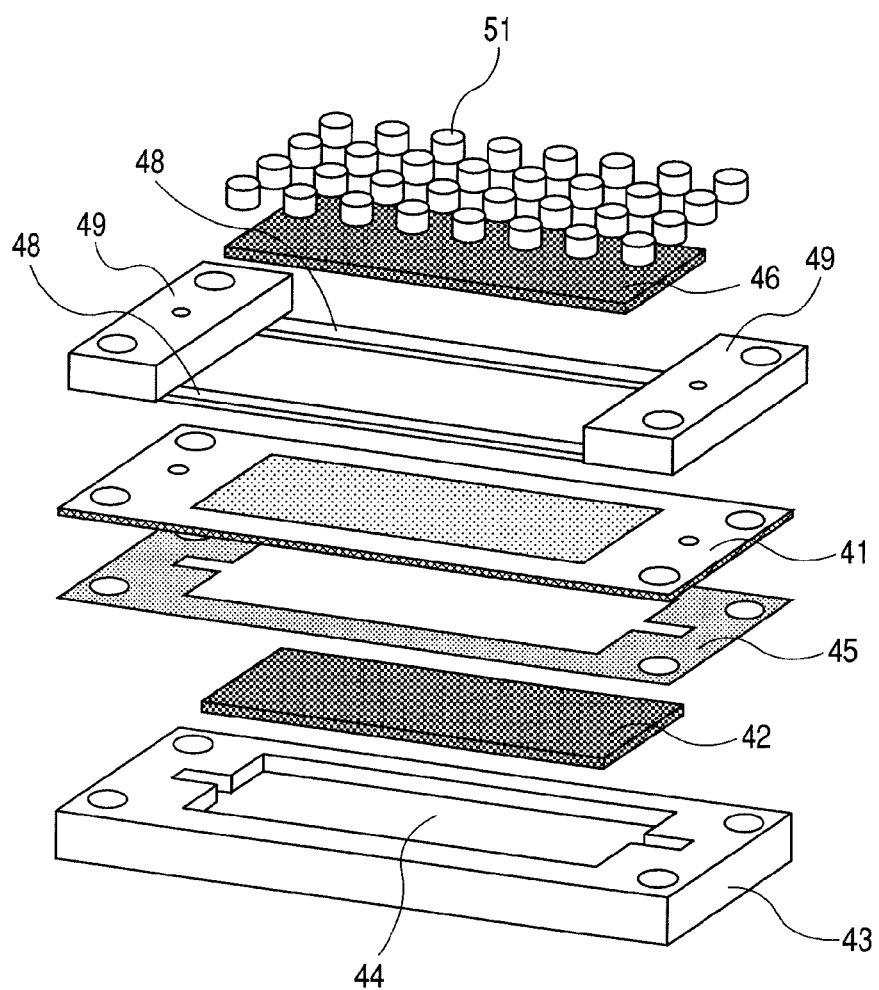
FIG. 16 is an exploded perspective view for illustrating a structure of a fuel cell unit of a fuel cell according to Embodiment 6 of the present invention.

FIG. 16 is a schematic view of a structure of the fuel cell according to this embodiment.

In this embodiment, a parallel columnar member 51 is used in place of the foamed metal as the flow path forming member.

In this case, the parallel columnar member 51 includes plural columnar members arranged in parallel to each other, has conductivity, and has functions for maintaining a gap between the gas diffusion layer and the electrode plate on the oxidizer electrode side to be uniform.

Functions of the flow path forming member include allowing air flow from the side surface of the fuel cell unit to supply the air to the gas diffusion layer, compressing the gas diffusion layer substantially uniformly, thereby imparting conductivity between the gas diffusion layer and the electrode plate, and imparting the fastening pressure to the support member.

The current collection area may be small with respect to the gas diffusion layer to some extent, so when the fastening pressure is uniformly applied to the support member, the parallel columnar member or the like may be used.

The parallel columnar member is formed of a member having conductivity. Further, the parallel columnar member is designed to uniformly apply the fastening force to the support member and to uniformly compress the carbon cloth.

Further, a thin metal plate having plural holes bored therein may be disposed between the carbon cloth and the parallel columnar member. In this case, the carbon cloth is compressed more uniformly.

Further, in place of the parallel columnar member, a three-dimensional grid-like metal member etc. may also be used. Further, the foamed metal, the parallel columnar member, the three-dimensional grid-like metal member, and the like may be used in combination with each other as the flow path forming member.

For example, there may also be adopted a structure in which, on the side surface of the fuel cell unit, the parallel columnar member may be disposed to apply the fastening pressure to the support member, and the foamed metal may be disposed in a position corresponding to the carbon cloth on the inner side of the parallel columnar member.

The parallel columnar member or the three-dimensional grid-like member enables formation of larger flow paths and reduction of a risk of the flow paths being blocked by water generated in the power generation reaction of the fuel cell, thereby being desirable.

With the structure of the fuel cell of this embodiment, the member on the oxidizer electrode side opposed to the sealing material for sealing the fuel electrode, with respect to the polymer electrolyte membrane is a member having high flatness and high rigidity.

Accordingly, the fastening pressure can be sufficiently and uniformly applied to the sealing material. As a result, the sealing property is enhanced and the sealing of the fuel can be performed more reliably.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-330271, filed Dec. 7, 2006, which is hereby incorporated by reference herein in its entirety.

What is claimed is:

1. A fuel cell comprising a fuel cell unit including a membrane electrode assembly having catalyst layers provided on both surfaces of a polymer electrolyte membrane, the membrane electrode assembly being sandwiched between an oxidizer electrode and a fuel electrode, the fuel cell using air in an atmosphere as an oxidizer,
wherein the fuel cell unit further comprises:
a gas diffusion layer provided so as to be laminated at least to the catalyst layer on a side of the oxidizer electrode of the membrane electrode assembly;
a flow path forming member provided so as to be laminated to the gas diffusion layer, for allowing air flow therethrough; and
a support member that surrounds a portion of the gas diffusion layer and contacts the membrane electrode assembly,
wherein the support member is disposed in a position between the flow path forming member and the polymer electrolyte membrane, the position being opposed, with respect to the polymer electrolyte membrane, to a sealing material, which is in contact with the polymer electrolyte membrane and which is disposed on a side of the fuel electrode of the polymer electrolyte membrane, for sealing the fuel electrode, and
wherein the support member is more rigid than the sealing material.

2. The fuel cell according to claim 1, wherein the flow path forming member is made of a foamed metal.

3. The fuel cell according to claim 2, wherein the flow path forming member made of the foamed metal has, on a side of the membrane electrode assembly, a surface coming into contact with the support member and a surface coming into contact with the gas diffusion layer, and the surface coming into contact with the support member and the surface coming into contact with the gas diffusion layer have heights equal to each other.

4. The fuel cell according to claim 2, wherein the flow path forming member made of the foamed metal has, on a side of the membrane electrode assembly, a surface coming into contact with the support member and a surface coming into contact with the gas diffusion layer, and the surface coming into contact with the support member has a height smaller than a height of the surface coming into contact with the gas diffusion layer.

5. The fuel cell according to claim 2, wherein the flow path forming member made of the foamed metal has, on a side of the membrane electrode assembly, a surface coming into contact with the support member and a surface coming into contact with the gas diffusion layer, the surface coming into contact with the support member has a height larger than a height of the surface coming into contact with the gas diffusion layer.

6. The fuel cell according to claim 1, wherein the gas diffusion layer extends between the support member and the flow path forming member.

7. The fuel cell according to claim 1, wherein the flow path forming member comprises one of a parallel columnar member and a three-dimensional grid-like member.

8. The fuel cell according to claim 1, wherein the support member is made of a material having rigidity, and the material is selected from the group consisting of a metal, a ceramic, and a plastic.

9. The fuel cell according to claim 1, wherein the support member has a flat surface on a side of the polymer electrolyte membrane.

10. The fuel cell according to claim 1, wherein a surface of the support member on a side of the polymer electrolyte membrane is more flat than a surface of the gas diffusion layer.

11. The fuel cell according to claim 1, further comprising a fuel cell stack in which a plurality of the fuel cell units are laminated and fastened, wherein the fuel cell stack comprises a structure retaining member for regulating a height of each of the plurality of the fuel cell units.

* * * * *